United States Patent
Thathapudi et al.

(10) Patent No.: US 8,954,695 B1
(45) Date of Patent: *Feb. 10, 2015

(54) SECURE POOL MEMORY MANAGEMENT

(75) Inventors: Timothy Noel Thathapudi, Bangalore (IN); Srinivasa Dharwad Satyanarayana, Mysore (IN); Siddharth Arun Tuli, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 391 days.

This patent is subject to a terminal disclaimer.

(21) Appl. No.: 13/495,969

(22) Filed: Jun. 13, 2012

Related U.S. Application Data

(63) Continuation of application No. 12/687,019, filed on Jan. 13, 2010, now Pat. No. 8,209,510.

(51) Int. Cl.
*G06F 12/14* (2006.01)
*G06F 21/60* (2013.01)

(52) U.S. Cl.
CPC ............ *G06F 12/1491* (2013.01); *G06F 21/60* (2013.01)
USPC .......................................... 711/163; 711/171

(58) Field of Classification Search
None
See application file for complete search history.

(56) References Cited

U.S. PATENT DOCUMENTS

| | | | |
|---|---|---|---|
| 6,154,823 A | 11/2000 | Benayon et al. | |
| 6,826,672 B1 | 11/2004 | Brown et al. | |
| 6,895,508 B1 * | 5/2005 | Swanberg et al. | 726/16 |
| 7,299,384 B1 | 11/2007 | Rodriguez-Rivera et al. | |
| 8,108,649 B2 | 1/2012 | Inoue et al. | |
| 2004/0172513 A1 | 9/2004 | Nelson | |
| 2004/0221120 A1 | 11/2004 | Abrashkevich et al. | |
| 2007/0234297 A1 | 10/2007 | Zorn et al. | |
| 2009/0276602 A1 | 11/2009 | Chedru | |
| 2010/0138628 A1 | 6/2010 | Sze et al. | |
| 2010/0228936 A1 | 9/2010 | Wright et al. | |

OTHER PUBLICATIONS

Chapter 3 of "Intel Architecture Software Developer's Manual—vol. 3: System Programming," Intel Corp., May 1999, 42 pp.
U.S. Appl. No. 12/687,019, by Timothy Noel Thathapudi, filed Jan. 13, 2010.

* cited by examiner

*Primary Examiner* — Kaushikkumar Patel
(74) *Attorney, Agent, or Firm* — Shumaker & Sieffert, P.A.

(57) ABSTRACT

In general, the invention is directed to techniques for identifying memory overruns. For example, as described herein, a device includes a main memory that enables an addressable memory space for the device. A plurality of memory pages each comprises a separate, contiguous block of addressable memory locations within the addressable memory space. The device also includes a memory manager comprising a secure pool allocator that assigns a secure pool size value to a first one of the plurality of memory pages. The secure pool size value defines a plurality of protected memory spaces in the first memory page that partition the first memory page into a plurality of secure objects. The device also includes a memory management unit comprising secure pool logic that determines, based on the secure pool size value, whether a memory address is an address of one of the protected memory spaces in the first memory page.

23 Claims, 9 Drawing Sheets

SECURE POOL MEMORY MANAGEMENT

CROSS REFERENCE TO RELATED APPLICATIONS

This application is a continuation of application Ser. No. 12/687,019, filed Jan. 13, 2010, which is incorporated by reference in its entirety.

TECHNICAL FIELD

The invention relates to computer-based devices and, more particularly, to memory management within such devices.

BACKGROUND

Computer-based devices include one or more microprocessors, memory and associated logic that provide an execution environment for software. Such devices are susceptible to errors in the event software writes data to improper locations in a memory space within the execution environment. A frequent cause of such errors is memory overruns in which the data written by the software overwrites one or more memory locations beyond a memory space specifically allocated for the data. For example, computer-based devices typically utilize a heap of dynamically allocated memory to store data for program variables. A memory overrun occurs in the event the software writes data beyond the scope of memory allocated to hold the data, such as beyond the end of a queue. Memory overruns often lead to unpredictable or improper device behavior as the data may overwrite other program variables which, in severe instances, may result in system crashes and even facilitate execution of malicious program code.

One type of computer-implemented device for which a memory overrun may result in significant consequences is in the area of network devices, such as routers, firewalls, intrusion detection and prevention (IDP) devices and other network devices deployed within a network environment. For example, network users and, as a result, network administrators, expect a computer network to maintain a high degree of reliability and availability in order to increase the transparency and performance of network-related operations. However, a memory overrun due to a software bug or other reason may result in a crash of a critical network device, causing significant communication problems for the organization. Moreover, attackers continue to exploit vulnerabilities in such devices by, for example, sending malformed packets in an attempt to cause the devices to overrun memory boundaries. In some instances, memory overrun vulnerabilities allow attackers to crash the device or gain administrative control, thereby interrupting network availability and exposing the network to security breaches.

SUMMARY

In general, the invention is directed to techniques for detecting and preventing memory overruns during run-time execution of device processes. For example, techniques are described in which a device protects against memory overruns by providing an execution environment in which different memory addresses in a memory page can be designated as protected. Execution hardware of the device identifies and raises an error signal in response to any attempt to write to the protected addresses.

In one example implementation, a memory address space for the device is partitioned into multiple pages that are associated with entries in a page table. An operating system for the device allocates memory pages from a free page pool and designates a portion of the memory pages as secure by modifying the associated page table entries for the memory pages. In addition to indicating that a page is secure, a modified page table entry for the page partitions the page by specifying a size for a plurality of secure memory spaces within the page. The secure memory spaces are separated by protected memory addresses. Any of the secure memory spaces of the page may be allocated by the operating system to a requesting user software process. When a memory access hardware for the device receives a memory write instruction that references a memory address of a secure page, the memory access hardware determines, based on the page table entry for the secure page, whether the memory address is a protected memory address. If the intended write address is protected, the hardware will not execute the write command and instead raises a signal to indicate to the operating system that the attempted write caused an exception.

In one embodiment, the invention is directed to a method comprising the steps of partitioning an addressable memory space for a device into a plurality of memory pages, and assigning a secure pool size value to a first one of the plurality of memory pages, wherein the secure pool size value defines a plurality of protected memory spaces that partition the first memory page into a plurality of secure objects. The method additionally comprises the step of determining, based on the secure pool size value, whether a memory address is an address of one of the protected memory spaces in the first memory page.

In another embodiment, the invention is directed to a device comprising a main memory that enables an addressable memory space for the device, and a plurality of memory pages, wherein each of the plurality of memory pages comprises a separate, contiguous block of addressable memory locations within the addressable memory space. The device further comprises a memory manager comprising a secure pool allocator that assigns a secure pool size value to a first one of the plurality of memory pages, wherein the secure pool size value defines a plurality of protected memory spaces in the first memory page that partition the first memory page into a plurality of secure objects. The device additionally comprises a memory management unit comprising secure pool logic that determines, based on the secure pool size value, whether a memory address is an address of one of the protected memory spaces in the first memory page.

In another embodiment, the invention is directed to a computer-readable medium containing instructions. The instructions cause a programmable processor to partition an addressable memory space for a device into a plurality of memory pages, and to assign a secure pool size value to a first one of the plurality of memory pages, wherein the secure pool size value defines a plurality of protected memory spaces in the first memory page that partition the first memory page into a plurality of secure objects. The instructions further cause a programmable processor to determine, based on the secure pool size value, whether a memory address is an address of one of the protected memory spaces in the first memory page.

The techniques described herein may present several advantages. For instance, attempts by a software process to write beyond the memory allocated from a secure page for any given software object causes the memory access hardware to immediately raise an error signal that may be used to detect and prevent the memory overrun. This may aid program debugging by allowing developers to quickly pinpoint the cause of the attempted overrun and remedy the overrun vulnerability. In programs that retain overrun vulnerabilities, the techniques may nevertheless prevent both inadvertent memory overruns and exploitation of the vulnerability by malicious code at run-time, leading to a more secure system and improved reliability. In addition, the detection techniques are implemented in the memory access hardware, and, unlike many conventional methods for detecting overruns, may avoid reductions in memory access throughput.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
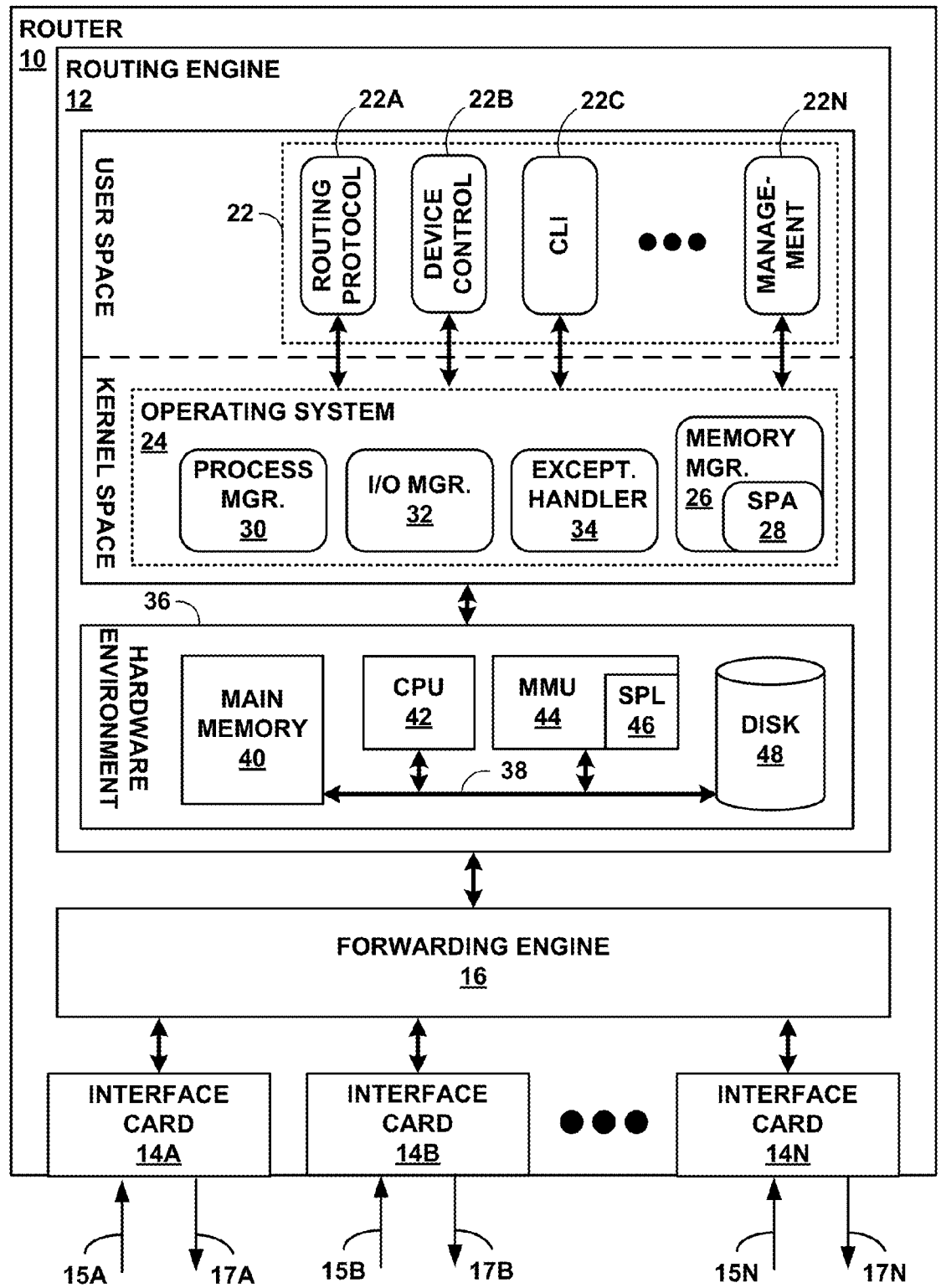
FIG. 1 is a block diagram illustrating an exemplary router that implements the techniques described.

FIG. 1 is a block diagram illustrating an exemplary router 10 that allocates secure object pools to enable detection of memory overruns in accordance with the principles of the invention. Although described with respect to a router, the techniques are applicable to other network and general-purpose computing devices, such as switches, intrusion detection and/or prevention systems, desktop/laptop computers, handheld devices, gaming consoles, and any other device susceptible to memory overruns.

In the illustrated embodiment, router 10 includes plurality of physical interface cards 14A-14N (collectively, IFCs 14), a forwarding engine 16 and a routing engine 12. Routing engine 12 generates forwarding information for forwarding engine 16 in accordance with routing information received from other network devices with which router 10 communicates. Forwarding engine 16 forwards incoming packets received via inbound links 15A-15N to an appropriate next hop, determined from the forwarding information, via outbound links 17A-17N.

Forwarding engine 16 and routing engine 12 may be implemented in any combination of software, hardware, or firmware. For example, forwarding engine 16 and routing engine 12 may comprise one or more processors that execute software instructions to perform the functions described herein. In that case, the software instructions may be stored on a computer-readable medium, such as computer memory or hard disk.

In this example, routing engine 12 includes hardware components 36 that comprises central processing unit 42 ("CPU 42"), memory management unit 44 ("MMU 44"), main memory 40, and disk 48 interconnected via system bus 38. CPU 42 executes program instructions loaded into main memory 40 from disk 48 in order to operate routing engine 12. MMU 44 handles memory access requests, including read and write requests, to main memory 40 by CPU 42. CPU 42 and MMU 44 may each comprise one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure suitable for implementation of the techniques described herein. In some embodiments, MMU 44 is integrated into CPU 42. In some embodiments, MMU 44 and CPU 42 are additionally coupled via an address bus. In such embodiments, MMU 44 exchanges address information with CPU 42 via the address bus, while CPU 42 communicates with main memory 40 via system bus 38. In such embodiments, MMU 44 and CPU 42 may be additionally coupled via a signal line that permits CPU 42 to indicate to MMU 44 whether the current memory access is a read access or a write access as well as a second signal line that permits MMU 44 to raise an exception to CPU 42.

Disk 48 comprises computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store the desired information and that can be accessed by routing engine 12.

Main memory 40 comprises one or more computer-readable storage media, which may include random-access memory (RAM) such as various forms of dynamic RAM (DRAM), e.g., DDR2 SDRAM, or static RAM (SRAM), flash memory, or any other form of fixed or removable storage medium that can be used to carry or store desired program code and program data in the form of instructions or data structures and that can be accessed by a computer. Main memory 40 provides a physical address space composed of addressable memory locations. Routing engine 12 partitions the physical address space of main memory 40 into user space, allocated for running user processes, and kernel space, which is protected and generally inaccessible by user processes.

Routing engine 12 further includes operating system 24, executing in kernel space, that provides an operating environment for multiple daemons 22A-22N ("daemons 22"), which run as processes in the user space of main memory 40. One example of operating system 24 is the JUNOS™ operating systems provided by Juniper Networks, Inc. of Sunnyvale, Calif. Another example of operating system 24 is Berkeley Software Distribution, or BSD, which is available in free and commercial variants. Daemons 22 include routing protocol daemon 22A, device control daemon 22B, command-line interface 22C, and management daemon 22N. Various embodiments of routing engine 12 may include more, fewer, or different daemons.

Operating system 24 comprises certain kernel processes, including process manager 30, input/output ("I/O") manager 32, exception handler 34, and memory manager 26. Process manager 30 multitasks routing engine 12 processes by initializing, scheduling, and switching daemons 22 and processes for operating system 24 for access to routing engine 12 resources, especially CPU 42.

I/O manager 32 provides an interface, e.g., system calls, to enable daemons 22 to exchange data and/or instructions with main memory 40, disk 48, and forwarding engine 16 or to direct the components to exchange data and/or instructions with each other. I/O manager 32 includes device drivers for main memory 40, disk 48, and forwarding engine 16. In some embodiments, router 10 may interface with peripheral devices, such as a keyboard, a computer mouse, or a display device (not shown). In such embodiments, I/O manager 32 provides interfaces to the peripherals.

Exception handler 34 enables operating system 24 and/or daemons 22 to react to a signal (or "exception") generated by the routing engine 12 hardware (e.g., CPU 42 or MMU 44) in response to an instruction currently being handled by the hardware. For example, CPU 42 may generate an exception in response to an unrecognized instruction that CPU 42 is unable to execute. As another example, MMU 44 may generate an exception in response to an instruction that directs CPU 42 to overwrite a memory location in kernel space. Exceptions cause exception handler 34 to hijack the execution thread, and, depending on the nature of the exception, exception handler 34 may perform one or more of a number of steps that range from ignoring the exception to notifying or ending the execution of the offending process.

Memory manager 26 controls the allocation, use, and deallocation of physical address space provided by main memory 40 for routing engine 12 processes, including kernel processes and daemons 22.

In exemplary routing engine 12, memory manager 26 cooperates with MMU 44 to implement virtual memory techniques and thereby provide a separate virtual address space for each of daemons 22. Virtual memory techniques allow each of daemons 22 to experience the illusion of an exclusive, contiguous addressable memory space when in fact daemons 22 share the physical address space provided by main memory 40. In addition, the techniques permit a larger address space than that provided by main memory 40, which simplifies program development and enables multitasking of memory-intensive processes. The total amount of address space required by processes running in routing engine 12 may exceed the amount of physical address space provided by main memory 40. In the illustrated embodiment, to increase the amount of address space available beyond the limitations of main memory 40, memory manager 26 relocates blocks of memory from active primary memory (main memory 40) to disk 48, which provides secondary memory storage. Memory manager 26 swaps such memory blocks to and from main memory 40 and disk 48 as needed in order to provide physical memory space for an executing process.

Memory manager 26 implements a page-based memory system to further virtual memory techniques by partitioning the virtual and physical address spaces into a plurality of fixed-length blocks referred to herein as pages. For example, each page may comprise 4 KB of contiguous address space. As another example, a page may comprise 4 MB of contiguous address space. Memory manager 26 swaps pages in main memory 40 to/from disk 48 using the process described above, which is hereinafter referred to as paging. The virtual address spaces for daemons 22 include virtual pages that each, if allocated, map to a physical page in main memory 40. As described in detail with regard to FIGS. 5 and 6, memory manager 26 maintains, for each process, a set of page tables (not shown in FIG. 1) in kernel space that establishes a mapping between a virtual address/virtual page number for the process and one of the physical pages. The virtual address itself maps to the location of the virtual address within the physical page. MMU 44, when requested by CPU 42, uses the mapping information found in the page tables to translate virtual addresses to corresponding physical addresses in main memory 40. During a memory access, the page tables may indicate that the page that comprises the memory required is not available in main memory 40 and is instead presently paged to disk 48. In such instances, memory manager 26 swaps the required page from disk 48 to main memory 40 and updates the page tables accordingly. In some embodiments, memory manager 26 uses a variable size memory block scheme called segmentation to implement virtual memory techniques.

When process manager 30 initiates execution of one of software daemons 22, memory manager 26 typically allocates a stack and a heap within the virtual address space for the daemon. Memory manager 26 manages the heaps for daemons 22 dynamically by temporarily allocating, when requested, blocks of memory for use by the requesting one of daemons 22 and freeing the memory when the block of memory is freed by the daemon. Allocated memory blocks on the heap are referenced by a pointer that may be manipulated by daemons 22. By contrast, stack memory generally is statically allocated when a function is called. Although the techniques are described with respect to the heaps of the various daemons 22, the techniques are translatable to other portions of memory. For example, the techniques are additionally applicable to the process stack, the system (kernel) heap, the system (kernel) stack, globally-defined variables associated with an execution thread, and memory mapped regions.

Memory manager 26 represents operating system level software that provides an interface with which daemons 22 request dynamically allocable address space from a process heap for use by the requesting daemon at run-time. In some embodiments, the interface is a system call that invokes a kernel function to allocate and return one or more blocks of memory for use by the invoking process. The interface provided by memory manager 26 may, for instance, be invoked using the well-known malloc function call, which invokes the sbrk system call.

Memory manager 26 of operating system 24 performs memory pool allocation by pre-allocating, for multiple block sizes, a plurality of memory blocks having the same size. Memory manager 26 maintains a directory of memory blocks of various sizes for disbursement to requesting processes, such as daemons 22. If memory manager 26 exhausts the memory blocks of a certain size, memory manager 26 allocates additional blocks of that size.

In some embodiments, memory manager 26 may additionally use buddy memory allocation, in which memory is allocated in progressively smaller blocks with sizes that are a power of two. Freed blocks are combined with their "buddy," if also free, to reduce fragmentation.

Due to defects (i.e., bugs) in program or library code, processes executing in routing engine 12, including kernel processes and/or one or more of daemons 22, may attempt to overwrite memory locations adjacent to the contiguous memory space of a specific size specifically allocated by memory manager 26 to store a data structure. The adjacency may be at either a higher address (i.e., an overrun) or a lower address (i.e., an underrun) than the allocated memory space. The term "overrun" is used as an umbrella term to encompass both circumstances. In addition, processes executing in routing engine 12 may also attempt to overwrite memory locations in a manner that is not intended by the system developers. For example code that may cause such attempts, consider the following C program code snippets.

Example 1 memcpy (A, "0", Size) /* If sizeof(A)==50, Size>50, and two
 * objects of type A are beside each other in the
 * heap, the second object A gets corrupted.
 */

Example 1 thus illustrates a library call that overruns the bounds of an object.

Example 2

```
Struct A {
    Struct B* b;
    Struct C* c;
    Struct D d; /* sizeof (struct D) is 50 bytes */
    Struct A* next;
}
Foo (char* s)
{
    For (i=0; i<= 100; i++)
    {
        *s++ = temp;      /* This instruction overwrites *next and
                           * following memory locations
                           * once variable i reaches 50.
                           */
    }
}
...
Foo ( (char *) &A->d );
...
```

Example 2 illustrates a memory overrun that does not result from a library call, but is instead caused by a bug in the program code. Conventional techniques for avoiding memory overruns, such as safe libraries, are generally unable to prevent memory overruns of this nature.

While certain consummated memory overruns may be benign, others may inadvertently or be deliberately engineered to lead to erratic process behavior, system crashes, or security breaches.

In accordance with the techniques herein described, memory manager 26 includes secure pool allocator 28 ("SPA 28") and MMU 44 includes secure pool logic 46 ("SPL 46") that cooperate to guard against memory overruns. Secure pool allocator 28 extends memory manager 26 to allocate a secure object pool within a memory page for a particular object size, where each object on that page can be individually protected from memory overruns or underruns. The secure object pool for a secure pool memory page comprises a plurality of memory spaces of equal size ("secure pool objects"), where each of the memory spaces within the page is a block of contiguous memory addresses. Secure pool allocator 28 assigns a secure pool size value to a memory page, effectively dedicating that particular memory page as a secure pool memory page for storage of any data object having a size less than or equal to the secure object size defined by the secure pool size value for the secure pool memory page. Assignation may occur at run-time or prior to process execution. Memory manager 26 maintains and disburses secure objects to requesting process, such as daemons 22, executing on routing engine 12 in a manner similar to that used in conjunction with memory pool allocation. If memory manager 26 exhausts the pool of secure objects for a particular secure pool size, secure pool allocator 28 assigns the secure pool size to an additional memory page to generate additional secure objects. Exemplary routing engine 12 defines seven different secure pool sizes—one to seven—starting at 32 bytes (secure pool size=1) and increasing by powers of two unto 2048 bytes (secure pool size=7). A secure pool size of zero indicates that the memory page is a normal memory page that does not contain secure objects. Accordingly, a 4 KB page is capable of containing two 2048-byte secure objects, four 1024-byte secure objects, etc. Different system architecture choices may lead to different sizes for, among other things, memory pages, desired secure object sizes, and the like. Accordingly, the values described above are only exemplary.

In exemplary routing engine 12, secure pool allocator 28 of memory manager 26 modifies page table entries for the allocated memory pages to include additional data (e.g., a field) to specify the secure pool sizes associated with the memory pages. For example, secure pool allocator 28 may instruct MMU 44 to treat an individual memory page as a secure pool page by modifying the entry for the page in a page table to reflect the secure pool size assigned to the memory page. For example, secure pool allocator 28 may set the page table entry secure pool size field to seven to indicate that the corresponding memory page contains 2046-byte secure objects. In some embodiments, in the case of large memory pages, secure pool allocator 28 modifies a page directory entry in a substantially similar manner.

In addition, secure pool allocator 28 extends the memory manager 26 interface by which daemons 22 request dynamically allocable address space. Specifically, one of daemons 22 may request, using the modified interface, secure objects from memory manager 26. In other words, rather than simply requesting an undifferentiated block of memory having a particular size, a requesting process can ask memory manager 26 to return a secure object of a certain size. For example, if one of daemons 22 needs a memory space for a 100-byte array, the daemon may invoke the modified interface to ask for a 128-byte secure object, which memory manager 26 provides. In some embodiments, the modified interface is a modified system call that receives a secure pool size as a parameter. For example, one of daemons 22 may invoke a modified malloc (int secure_pool_size) to invoke a modified system call sbrk (int secure_pool_size) in order to receive a pointer reference to a secure object having a size as defined by the secure_pool_size parameter in a secure pool memory page.

Operating in conjunction with secure pool allocator 28, which allocates the secure objects on a secure pool memory page, secure pool logic 46 extends MMU 44 to ensure that each secure object includes a protected memory space, where each protected memory space is a contiguous block of memory address locations. In exemplary routing engine 12, the protected memory space for each secure object comprises the first four bytes of the secure object, leaving the remaining space for data object storage. For example, a 32-byte secure object includes four bytes of leading protected memory space and twenty-eight subsequent bytes usable for data object storage. Because each secure object has a leading protected memory space, the protected memory spaces separate all of the data object storage spaces of the various secure pool objects on the corresponding secure pool memory page.

The addresses of the protected memory spaces are easily calculable in exemplary routing engine 12. As illustrated in detail in FIG. 3, in one example implementation, the protected memory space for the first secure object on a secure memory page is also the first four bytes of the page. Because memory pages begin at virtual addresses that are multiples of the size of a memory page, a one word (in exemplary routing engine 12, one word=4 bytes) memory access to a protected memory space of a secure memory page may be identified by testing the n least significant bits (or in some instances, the n most significant bits) of the virtual address, where n is calculated as the base-2 logarithm of the secure object size specified for the secure memory page. In other words, $n=\log_2$(secure_object_size). When each of the n least significant bits is zero, the attempted memory access is to a protected memory space. For example, for a secure memory page having 32-byte secure objects, the protected memory space addresses are identified by addresses that have the $\log_2(32)$, or 5, least significant bits set to zero.

Secure pool logic 46 identifies circumstances in which instructions executing for one of daemons 22 attempt to write or perform otherwise impermissible memory accesses to the protected memory space of a secure pool object. Recall that MMU 44 uses the mapping information found in page table entries to translate, during memory accesses, virtual addresses to corresponding physical addresses in main memory 40 or in secondary storage in disk 48. Secure pool logic 46 extends this functionality to analyze the secure pool size value of a page table entry for a memory page being accessed by a process, such as one of daemons 22, with a virtual address. If the secure pool size value is zero, the memory page does not contain secure objects and the memory access proceeds normally. Otherwise, secure pool logic 46 uses the secure pool size value to determine the addresses of the protected memory space in the secure memory page according to the procedure described above. That is, secure pool logic 46 determines whether the $n=\log_2$(secure_object_size) least significant bits of the virtual address being accessed are zero. If the n least significant bits are zero, and the memory access is promoting a write instruction or other impermissible access operation, then secure pool logic 46 directs MMU 44 to generate and throw a "secure pool page fault" exception to operating system 24 that signals an attempt to violate a protected memory space.

In this manner, secure pool allocator 28 and secure pool logic 46 cooperate to specify protected memory spaces within memory pages and to alert the operating system 24 when a process attempts to violate a protected memory space.

Exception handler 34 catches the secure pool page fault exception and executes an appropriate response. For example, exception handler 34 may in some instances ignore the exception and allow the execution thread that caused the exception to continue. In other instances, exception handler 34 forwards the exception to the one of daemons 22 or other process that caused the exception in order to allow the errant process to determine the appropriate path forward, which may include killing an errant thread. In other instances, exception handler 34 may kill the process, log the error along with identifying circumstances (e.g., the address of the memory that caused the exception, the address of the instruction that caused the instruction, and the like), direct I/O manager 32 to generate a user alert, or perform some other remediation.

A process that allocates and uses secure objects in the manner described may thus detect and prevent memory overruns of a secure object while the instruction that is attempting to perform the improper write is executing. This can substantially aid the debugging process for complex programs subject to infrequent memory overruns. In addition, any decrease in memory overruns leads to more reliable and secure software and to greater data integrity for router 10. Implementing the techniques on a page-based memory system and thus consolidating secure objects onto memory pages enables the techniques to detect and prevent memory overrun causes that are difficult to pinpoint in conventional systems, such as double free vulnerabilities (caused by deallocating the same memory buffer more than once).

Moreover, because the memory overrun prevention techniques are implemented, in part, using secure pool logic 28 hardware in exemplary routing engine 12, the techniques may avoid injecting into process execution the substantial delays that many software-based memory protection schemes are subject to.

Figure 2:
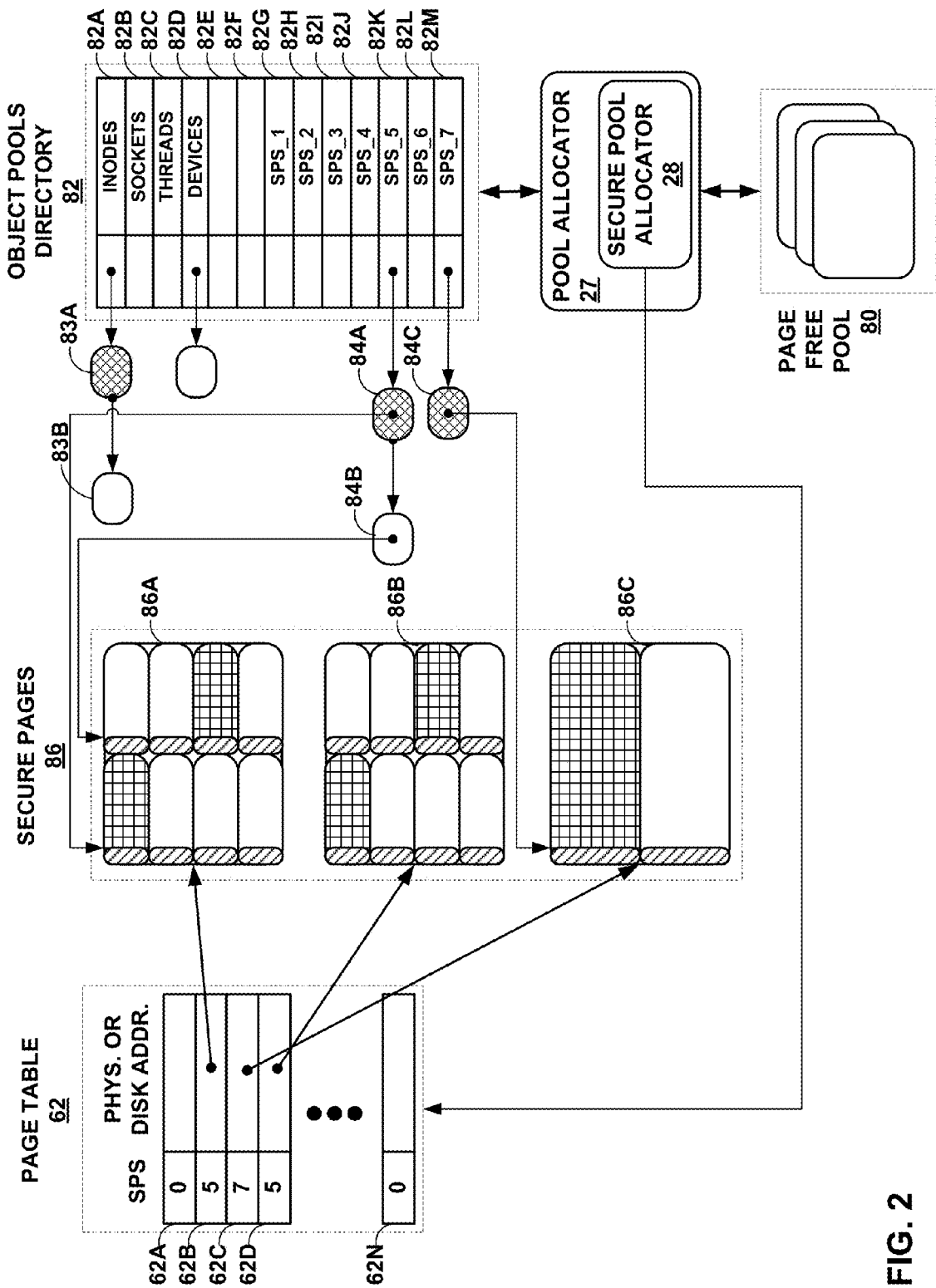
FIG. 2 is a block diagram illustrating exemplary components of the router of FIG. 1 and exemplary data structures used by the components to perform the techniques herein described.

FIG. 2 is a block diagram illustrating exemplary components of memory manager 26 as well as exemplary data structures used by the components to perform the techniques described.

Memory manager 26 comprises, for each process that has its own virtual address space, a page table 62 having page table entries 62A-62N that each establish a mapping between a virtual page number for the process and one of the physical pages in main memory 40 or disk 48 of routing engine 12. Provided a virtual address, MMU 44 uses page table 62 to find the physical page that includes the corresponding physical address in main memory 40. If the physical page is not present in main memory 40, memory manager 26 loads the page from disk 48 to a location in main memory 40 and updates page table 62 to reference that location.

Page table entries 62A-62N also include a field that indicates whether the pages corresponding to the entries are secure memory pages and, if so, specifies a secure pool size for the secure memory pages. For example, page table entry 62A has a secure pool size of zero, which indicates that the memory page (not shown in FIG. 2) corresponding to page table entry 62A is not a secure memory page. However, page table entry 62B has a secure pool size of five, indicating that the corresponding memory page is a secure memory page (in this instance, secure page 86A) and comprises secure objects that are each 512 bytes.

Page table 62, although illustrated logically as a single table, is implemented as multiple tables in exemplary memory manager 26. In some embodiments, page table 62 comprises separate data structures for physical page address in main memory 40 and for disk page address in disk 48.

Memory manager 26 further comprises pool allocator 27, which maintains a page free pool 80 and object pools directory 82 for each process that has its own virtual address space. In some embodiments, pool allocator 27 may combine a subset of the data structures for all processes. However, the techniques are described, for FIG. 2, with regard to a single routing engine 12 process, such as one of daemons 22, that corresponds to the data structures illustrated.

Page free pool 80 comprises the virtual pages that are not presently allocated for use by the process. Object pools directory 82 is a table of entries, where each entry includes a list of references to memory blocks (or objects) allocated by pool allocator 27 to store a particular data object type for the process. In other words, each entry references an object pool for a corresponding data object type. As an example, the object pool directory entry 82A includes references 83A-83B that point to objects allocated to store inode data structures, which maintain file information for the process. The memory block associated with reference 83A is currently reserved for use by the process (as illustrated by the hash). While illustrated and described as a table, object pools directory 82 may be another type of data structure, such as a tree, a linked list, or one or more queues. Memory manager 26 stores page table 62, object pools directory 82, and page free pool 80 in special write-protected memory pages in main memory 40. In some embodiments, these special write-protected memory pages may be paged to disk 48.

When the process corresponding to object pools directory 82 requests memory space for an object of a type listed in object pools directory 82, memory manager 26 finds an unreserved allocated object from the object pool, marks the object as reserved, and returns a reference (e.g., a pointer) to the object. If all of the objects in the object pool are reserved, memory manager 26 directs pool allocator 27 to allocate additional objects for the object pool when the object is requested. As directed, pool allocator 27 retrieves a free page from page free pool 80, allocates objects on the page, and inserts references to the objects into the appropriate object pool directory entry. When the process frees the object, memory manager 26 returns the object to its corresponding object pool by unmarking the object. Pool allocator 27 may deallocate unmarked objects on a page and return the page to page free pool 80.

Object pools directory 82 comprises entries 82G-82M (hereinafter, "secure pool entries 82G-82M"). Each of secure pool entries 82G-82M corresponds to a different secure pool size 1-7 and includes a list of references to secure objects sized according to the secure pool size of the entry. For instance, secure pool entry 82K corresponds to secure pool size 5 and includes references 84A and 84B. References in secure pool entries 82G-82M to secure objects bypass the four bytes of leading protected memory space and instead point to the subsequent bytes usable for data object storage. As a result, when memory manager 26 returns, to a process, a reference (e.g., a pointer) to a secure object, the process writes to the write-permissible data object storage space of the secure object rather than to the leading protected memory space.

As illustrated examples, reference 84A points to a first object in secure page 86A that is reserved, while reference 84B points to another secure object in secure page 86A that is unreserved. Additional references to objects in secure pages 86A and 86B that would otherwise be present are not shown for ease of illustration. As another example, secure pool entry 82M corresponds to secure pool size 7 and includes reference 84C to a first secure object in secure page 86C.

Pool allocator 27 includes secure pool allocator 28 that allocates secure objects in secure memory pages in accordance with the techniques herein described. Secure pool allocator 28 may either preallocate or dynamically allocate secure objects in response to a direction from memory manager 26 to generate additional such objects. Provided a secure pool size, secure pool allocator 28 allocates a free page from page free pool 80, partitions the page into secure objects based on the secure pool size, and generates and inserts references to the secure objects into the appropriate entry in object pools directory 82. In addition, secure pool allocator 28 modifies the secure pool size field of the appropriate one of page table entries 62A-62N for the allocated page to indicate that the allocated page is a secure page and to specify the size of the secure objects on the page.

When the process associated with object pools directory 82 requests a secure object of a particular size (e.g., via the malloc (int secure_pool_size) function call described above), memory manager 26 consults the appropriate one of secure pool entries 82G-82M to find an unmarked reference in the secure object pool. If an unmarked reference is present, memory manager 26 marks and returns the reference to the process. If, however, all of the secure objects in the secure object pool are reserved, memory manager 26 directs secure pool allocator 28 to allocate additional secure objects. Memory manager 26 then returns a reference to one of the newly-allocated secure objects to the process. Secure objects, like the other objects referenced in object pools directory 82, may be deallocated and their memory pages returned, by secure pool allocator 28, to page free pool 80. When returning a page to page free pool 80, secure pool allocator 28 additionally clears the secure pool size field of the one of page table entries 62A-62N associated with the newly freed memory page to indicate that the page is no longer a secure page. Because memory manager 26 does not coalesce objects freed by the process, no garbage collection is needed.

In some embodiments, memory manager 26 either does not implement an object pools directory or does not include secure pools as object pools within the directory. In such embodiments, a process may use other data structures or simple variables to monitor the status of secure objects allocated by secure pool allocator 28.

Figure 3:
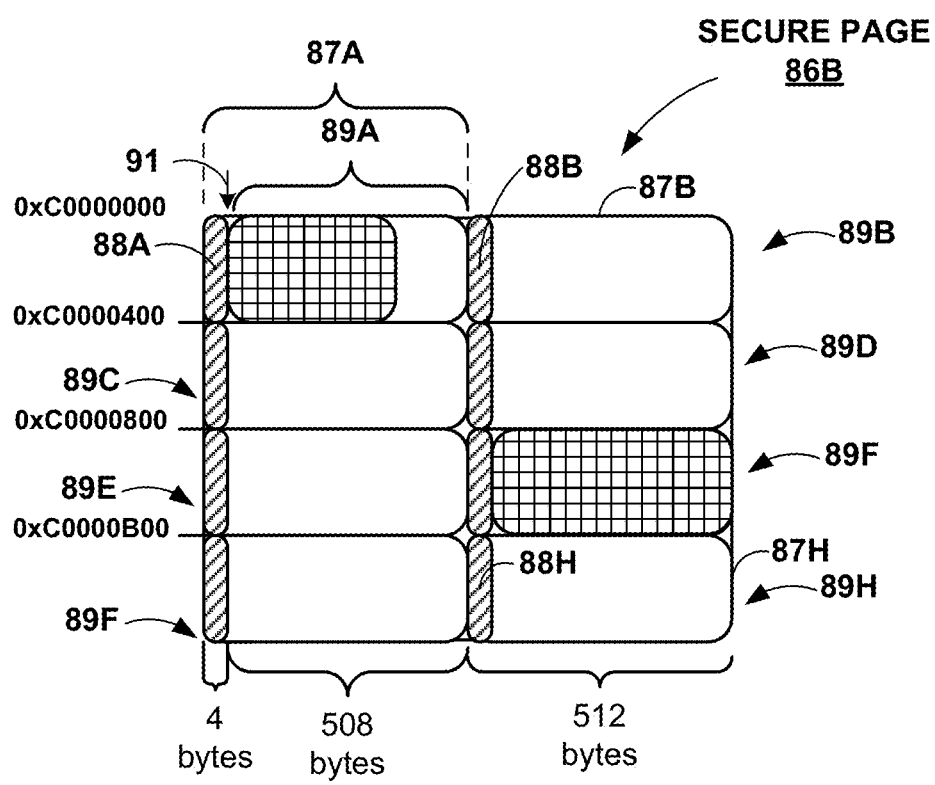
FIG. 3 is a block diagram illustrating an example memory page that has been allocated by the router of FIG. 1 to contain secure data objects in accordance with the techniques described herein.

FIG. 3 is a block diagram illustrating an example secure page of memory (page 86B) that has been allocated by secure pool allocator 28 in accordance with the techniques described herein. In this example, secure page 86B has a secure pool size value of five, which in exemplary routing engine 12 translates to secure objects that are each 512 bytes. Secure page 86B comprises 4 KB of virtual memory starting at virtual memory address 0xC0000000 and, accordingly, includes eight 512-byte secure objects 87A-87H ("secure objects 87").

Each of secure objects 87 includes a one word, or 4-byte, one of protected memory spaces 88A-88H (shown as diagonal hatching in FIG. 3). For example, secure object 87A includes protected memory space 88A, which in this example takes the form of four contiguous bytes of the lowest physical memory addresses of the memory space allocated for the secure object. The protected memory spaces 88 lie at the 512-byte boundaries of secure page 86B due to the 512-byte secure objects that occupy the page. Subsequent memory space in one of secure objects 87 is used as the data storage area for the secure object. For example, secure object 87A also includes data storage area 89A that follows protected memory space 88A. A reference to one of secure objects 87 in secure page 86B typically takes the form of resolution of a pointer to a head (e.g., head 91 pointing to a lowest physical address) of the data storage area 89 for the secure object. Consequently, write operations involving secure objects 87 avoid protected memory spaces 88 and instead typically begin at the head of data storage area 89A. The protected memory spaces 88 do not require markings, such as storing particular data, or special data structures to keep track of their memory locations for memory overrun detection purposes. Rather, protected memory spaces 88 are identified by the secure pool size field of page table entry 62B (illustrated in FIG. 2) and protected by secure pool logic 46 (illustrated in FIG. 1).

In response to requests by a routing engine 12 process, such as one of daemons 22, for a reference to a secure object (e.g., via the malloc (int secure_pool_size) function call described above), memory manager 26 returns a reference to a head of one of data storage areas 89, rather than to a head of one of secure objects 87. Upon receiving the reference, the routing engine 12 process may write to the corresponding data storage area 89 for the secure object. However, in accordance with the techniques described herein, attempted writes to one of protected memory space 88 cause secure pool logic 46 within MMU 44 to generate a secure pool page fault exception. Because protected memory spaces lie at the 512-byte boundaries of secure page 86B, the word addresses of the protected memory space have the least significant nine, or $\log_2(512)$, bits set to zero. For example, protected memory space 88A is located at address 0xC0000000, protected memory space 88B is located at address 0xC0000200, and so. Secure pool logic 46 can therefore easily determine whether an instruction is attempting to write to or perform an otherwise impermissible memory access to one of protected memory spaces 88 by simply testing the appropriate number of least significant bits of the virtual/physical address referenced by the instruction.

Figure 4:
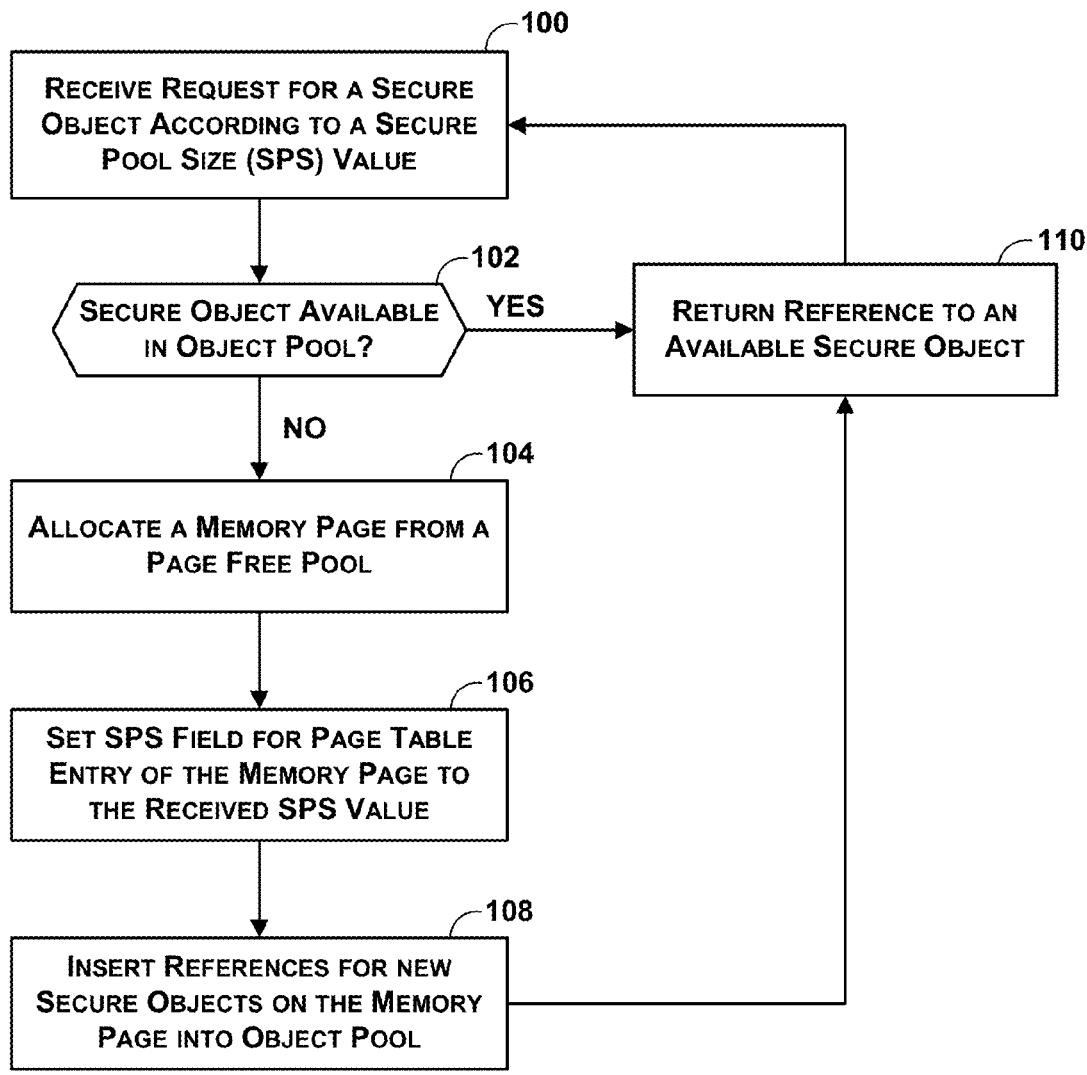
FIG. 4 is a flowchart illustrating exemplary steps for allocating secure object pools for data objects according to the techniques described herein.

FIG. 4 is a flowchart illustrating an example mode of operation for dynamic allocation, by memory manager 26 and secure pool allocator 28, of secure objects for a secure object pool and a requesting process according to the techniques described. Memory manager 26 receives a request for a secure object from a routing engine 12 process, such as one of daemons 22 (100). The request specifies that the object is to conform to a particular size, according to a secure pool size value. Memory manager 26 responds to the request by consulting object pools directory 82 for the requesting process to determine where there is an available secure object having the specified size in the object pool (102). If so (YES branch of 102), memory manager 26 responds with a reference to the available secure object and marks the object as no longer available (110). If all secure objects having the specified size in the object pool are in use by the process (NO branch of 102), however, memory manager 26 directs secure pool allocator 28 allocate additional secure pool objects. Secure pool allocator 28 first allocates a free memory page from page free pool 80 (104). Next, secure pool allocator 28 sets the secure pool size field in the one of page table entries 62 that corresponds to the allocated memory page (now one of secure pages 86) to the secure pool size value specified in the secure object request (106). The secure pool size value establishes the locations of the secure objects in the secure page, and, concomitantly, the locations of the data storage areas in the secure page. Secure pool allocator 28 inserts references to each of secure objects in the secure page into the object pool for the secure pool size value (108) and notifies memory manger 26 that additional secure objects are available for distribution. Memory manager 26 therefore responds to the earlier secure object request with a reference to an available secure object have the specified size (110).

Figure 5:
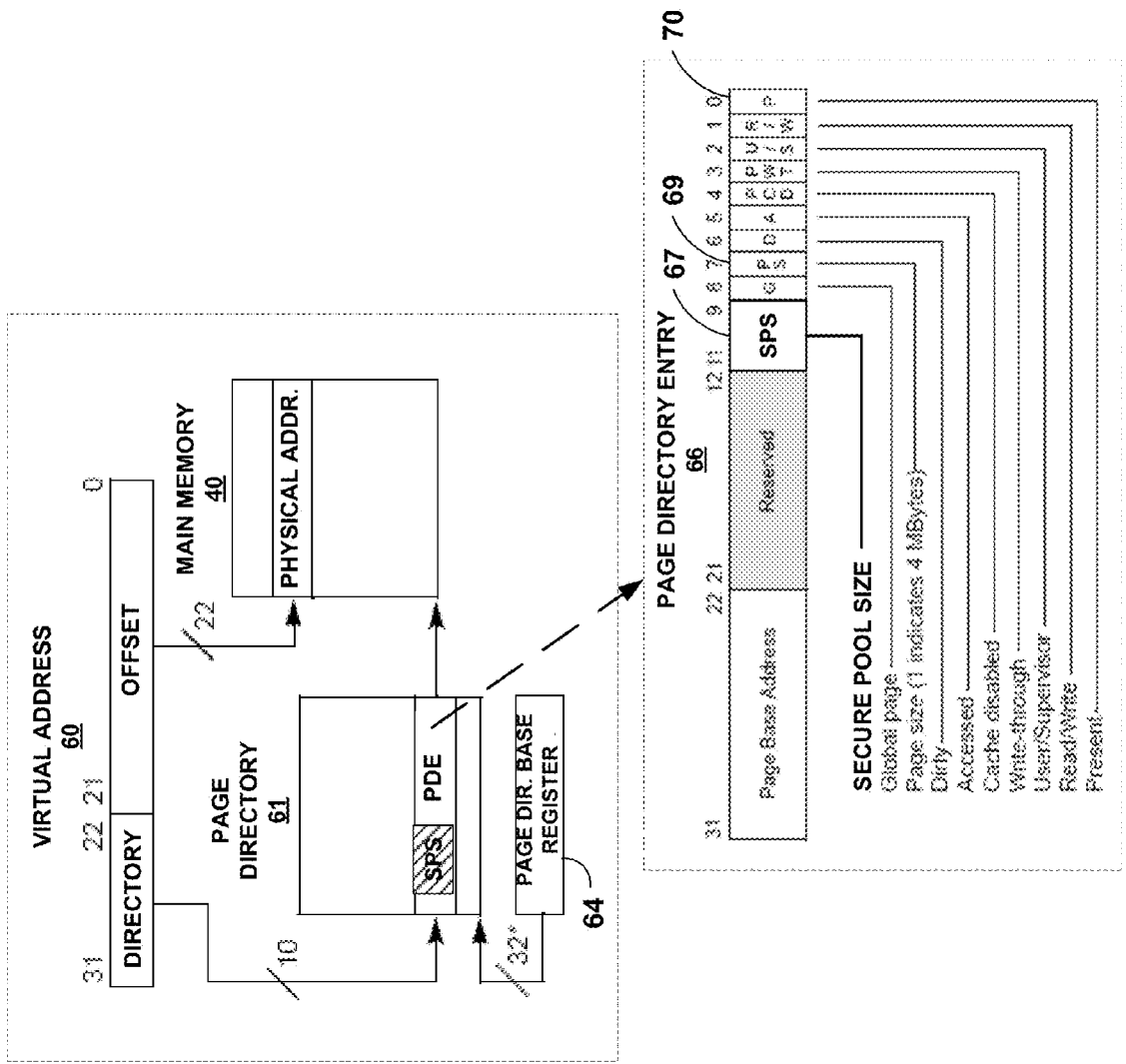
FIG. 5 is a block diagram illustrating an exemplary virtual to physical address mapping and an exemplary page directory entry modified to further the techniques described herein.

FIG. 5 is a block diagram illustrating an exemplary virtual to physical address translation for large pages (hereinafter, "large-page virtual address translation") and an exemplary page directory entry 66 according to the techniques described.

Routing engine 12, in addition to supporting 4-KB pages, also supports 4-MB pages in order to optimize memory accesses to large data structures. By reducing the number of pages required to store a large amount of data, 4-MB paging reduces the number of page table lookups that are required to address the large amount of data.

A large-page virtual address translation of virtual address 60 for an executing process, e.g., one of daemons 22, incorporates data from virtual address 60, page directory 61, and page directory base register 64 ("PDBR 64"). Virtual address 60 comprises 32-bits in order to support full addressing of the 32-bit virtual address space provided by routing engine 12. PDBR 64 stores the location, in main memory 40, of page directory 61 for the executing process. Process manager 30 restores PDBR 64 data as part of the state data for the executing process restored during a context switch to the executing process.

Page directory 61 is an array of 32-bit page directory entries, including page directory entry 66. Page directory 61 is stored in stored in main memory 40, though it may be paged to disk 48 when necessary. Virtual address 60 bits 22-31 index the location of the page directory entry for the address. As illustrated by page directory entry 66, page directory entries include 10 bits for a page base address, which maps page directory entry 66 directly to a 4-MB page in the physical address space of main memory 40. The remaining 22 bits of virtual address 60 offset to the physical address, for virtual address 60, within the 4-MB page indexed by page directory entry 66. Page directory entry 66 further comprises present flag 70. When present flag 70 (i.e., bit 0 in exemplary page directory entry 66) is cleared, the memory page associated with page directory entry 66 is not currently in physical memory, and memory manager 26 must first swap the page to main memory 40 from disk 48. Further information regarding the particulars of virtual memory and virtual to physical address translation may be found in "Intel Architecture Software Developer's Manual—Volume 3: System Programming," Intel Corp., 1999. Chapter 3 of "Intel Architecture Software Developer's Manual—Volume 3: System Programming" is incorporated herein by reference.

Page directory entry 66, like other page directory entries of page directory 61, includes page size flag 69 that, when set, indicates that page directory entry 66 maps to a 4-MB page that comprises the physical address corresponding to the virtual address.

Page directory entry 66, like other page directory entries of page directory 61, includes a 3-bit secure pool size field 67 ("SPS field 67") to store the secure pool size value for the memory page associated with page directory entry 66. Bits 9-11 of page directory entries in page directory 61 are conventionally reserved, in architectures such as 0x86-based processors manufactured by Intel Corp. of Santa Clara, Calif., for system programmer use. The techniques described leverage this support by assigning SPS field 67 to bits 9-11. As a 3-bit field, SPS field 67 assumes one of eight possible values in the range 0-7. A zero value indicates that the associated memory page for page directory entry 66 is not a secure page and should not trigger secure pool logic 46 during a memory access. Any other value for SPS field 67 besides zero indicates that the associated memory page is an allocated pool of secure objects and that secure pool logic 46 is to perform the memory protection techniques described for memory accesses of the memory page.

SPS field 67 defines seven different secure pool sizes for the associated memory page, starting at 32 bytes (secure pool size field value=1) and increasing by powers of two unto 2046 bytes (secure pool size field value=7). The size of the secure objects in the memory page determines the number of bits, according to the formula $n=\log_2(\text{secure\_object\_size})$, that must be cleared for secure pool logic 46 to raise an exception. Where SPS field 67 has a value of 1, the secure objects comprise 32 bytes, and a memory write to the associated memory page where the least significant 5 bits (i.e., bits 0-5) are set to zero causes secure pool logic 46 to raise an exception. As another example, where SPS field 67 has a value of 2, the secure objects comprise 64 bits, and secure pool logic 46 examines the least significant 6 bits. As a final example, where SPS field 67 has a value of 7, the secure objects comprise 2048 bits, and secure pool logic 46 examines the least significant 11 bits.

If page size flag 69 is cleared, page directory entry 66 maps to a page table and the physical address corresponding to the virtual address refers to an address comprised by a 4-KB page. Generally, if page size flag 69 is cleared and page directory entry 66 maps to a page table rather than to a 4-MB page, the SPS field 67 value is inconsequential. In such instances, secure pool logic 46 alternatively considers secure pool size values held by the page table entries according to the techniques described below with respect to FIG. 6.

In some embodiments that apply the techniques described, differing system requirements may result in alternative architectural choices regarding the size of the virtual address space, the particular data structures and fields for accomplishing virtual address translation, page sizes, and the type of page directory, among other options.

Figure 6:
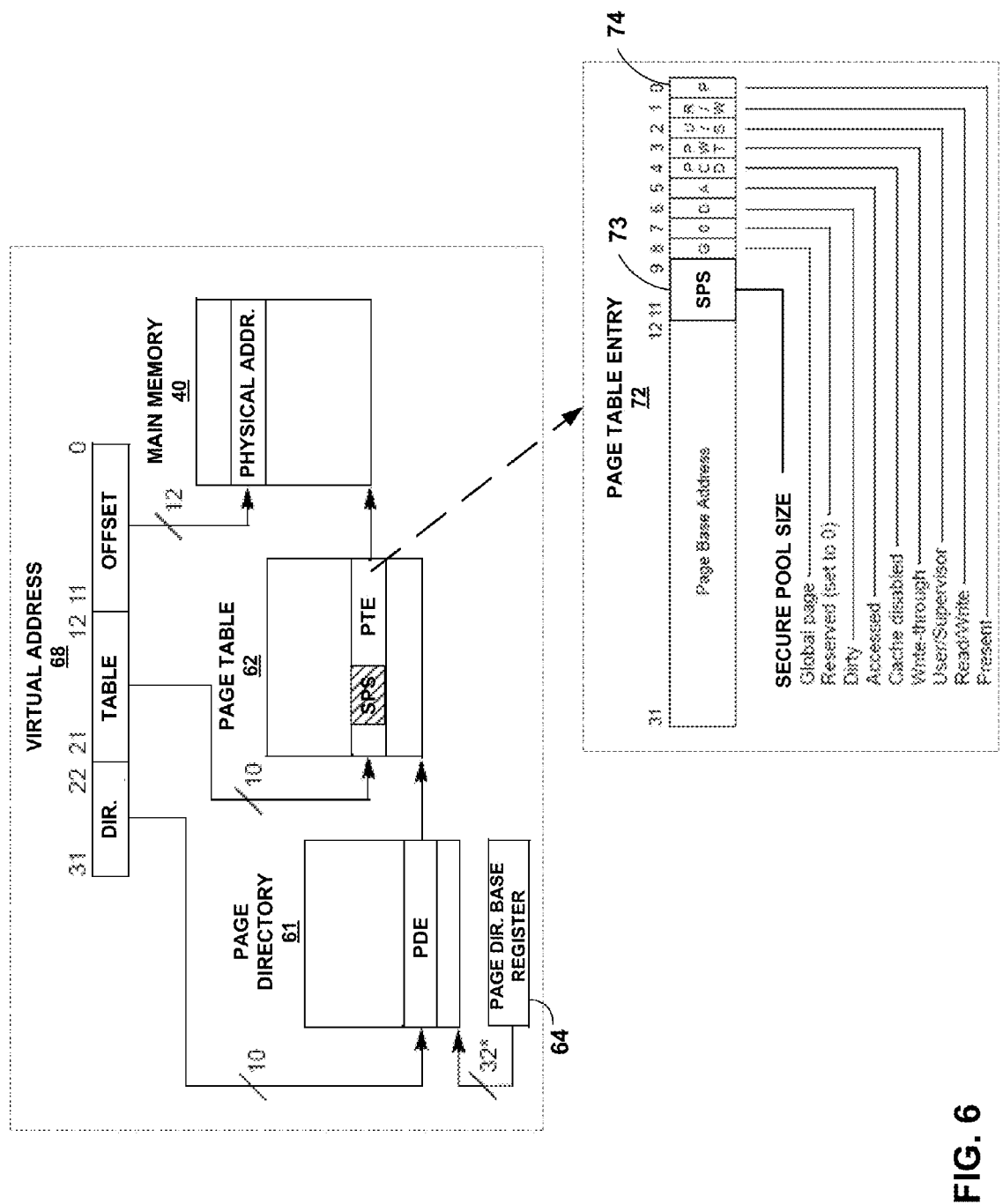
FIG. 6 is a block diagram illustrating another exemplary virtual to physical address mapping and an exemplary page table entry modified to further the techniques described herein.

FIG. 6 is a block diagram illustrating an exemplary virtual to physical address translation for 4-KB pages (hereinafter, "standard-page virtual address translation") and an exemplary page table entry 72 according to the techniques described.

A standard-page virtual address translation of virtual address 68 for an executing process, e.g., one of daemons 22, incorporates data from virtual address 68, page directory 61, PDBR 64, and page table 62. Virtual address 68 comprises 32-bits in order to support full addressing of the 32-bit virtual address space provided by routing engine 12.

Page directory 61 includes page directory entries that map to page tables. An executing process makes use of one or more page tables that each includes a plurality of page table entries. Virtual address 68 bits 22-31 index the location of the page directory entry in page directory 61 for the address. The page directory entry for the address maps to the address of page table 62. Virtual address 68 bits 12-21 offset to page table entry 72 within page table 62. As illustrated by page table entry 72, page table entries include 20 bits (bits 12-31) for a page base address, which maps page table entry 72 directly to a 4-KB page in the physical address space of main memory 40.

The remaining 12 bits (i.e., bits 0-11) of virtual address 68 offset to the physical address, for virtual address 68, within the 4-KB page indexed by page table entry 72. Page table entry 72 further comprises present flag 70. When present flag 70 (i.e., bit 0 in exemplary page table entry 72) is cleared, the memory page associated with page table entry 82 is not currently in physical memory, and memory manager 26 must first swap the page to main memory 40 from disk 48.

Page table entry 72, like other page table entries of page table 62 and the other page tables managed by memory manager 26, includes a 3-bit secure pool size field 73 ("SPS field 73") to store the secure pool size value for the memory page associated with page table entry 72. Bits 9-11 of page table entries in page table 62 are conventionally reserved, in architectures such as 0x86-based processors manufactured by Intel Corp. of Santa Clara, Calif., for system programmer use. The techniques described leverage this support by assigning SPS field 73 to bits 9-11 of page table entry 72.

SPS field 73 of page table entry 72 performs substantially similar functions to SPS field 67 of page directory entry 66. For example, SPS field 73 defines the size of secure objects held by the associated memory page when the associated memory page is a secure page. In addition, SPS field 73, when non-zero, triggers secure pool logic 46 to perform the memory protection techniques described.

In some embodiments that apply the techniques described, differing system requirements may result in alternative architectural choices regarding the size of the virtual address space, the particular data structures and fields for accomplishing virtual address translation, page sizes, and the type of page table, among other options. For example, some embodiments may employ inverted page tables, different forms of multilevel page tables, or virtualized page tables.

Figure 7:
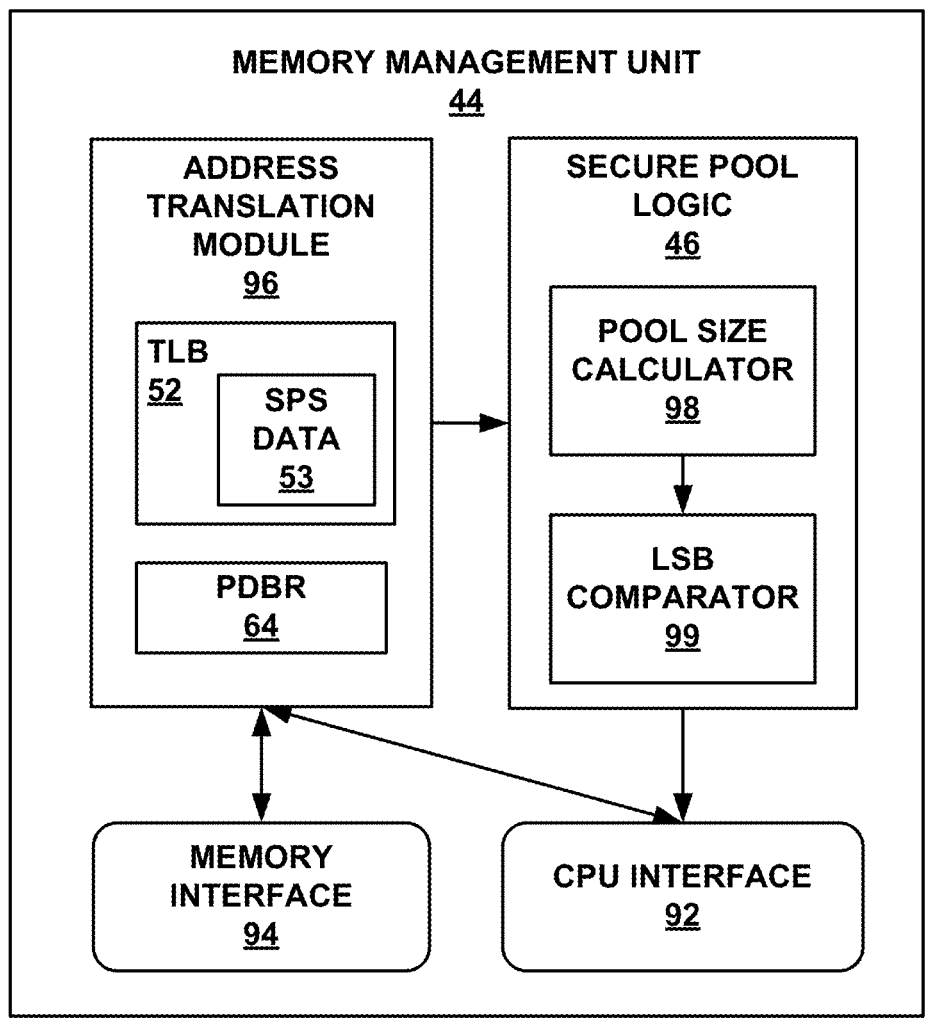
FIG. 7 is a block diagram illustrating an example memory management unit (MMU) for the router that performs the memory overrun detection techniques described herein.

FIG. 7 is a block diagram illustrating an example of MMU 44 of router 10 in greater detail. MMU 44 includes address translation module 96, secure pool logic 46, memory interface 94, and CPU interface 92.

CPU interface 92 receives memory access direction from CPU 42. A memory access direction may specify a read from memory direction or a write to memory direction. A memory access direction comprises a virtual address that address translation module 96 translates to a physical address. Address translation module 96 comprises page directory base register 96 ("PDBR 96"). As described above, PDBR 96 stores a memory reference to the page directories for the currently executing process. Address translation module 96 uses the PDBR and a received virtual address to translate the virtual address to a corresponding physical address according to either of the techniques described above with respect to FIGS. 5 and 6. That is, if the page directory entry specified by the PDBR and the virtual address specifies that the page size is 4-MB, address translation module 96 uses large-page virtual address translation as described with respect to FIG. 5. Otherwise, address translation module 96 uses standard-page virtual address translation as described with respect to FIG. 6.

In addition, because routing engine 12 stores page directories and page tables in main memory 40, address translation module 96 includes translation look-aside buffer 52 ("TLB 52"), which caches page table mappings recently used for standard-page virtual address translation. TLB 52 may be a content addressable memory (CAM), another form of hardware memory such as SRAM, an ASIC, or another type of cache. In some embodiments, TLB 52 is implemented as software and manipulable by components of operating system 24, such as memory manager 26.

Using TLB 52, address translation module 96 can often avoid accesses to main memory 40 for page directory entry and page table entry lookup by caching the results of those lookups in TLB 52. If the mapping for the virtual address received from CPU 42 is not cached in TLB 52 however (i.e. a TLB "miss"), address translation module 96 queries main memory 40 via memory interface 94 according to the process described above with respect to FIG. 6. In some embodiments, TLB 52 may additionally cache mappings to 4-MB pages to enable MMU 44 to more efficiently perform large-page virtual address translation.

TLB 52 additionally caches secure pool size data 53 for the translation cache entries to implement the techniques described. Secure pool size data 53 specifies the secure pool size values associated with pages that have cached mappings in TLB 52.

Address translation module 96, as an aspect of large-page virtual address translation, reads the secure pool size (SPS) value for the 4-MB page containing the address from SPS field 67 of page directory entry 66 for the page. As an aspect of standard-page virtual address translation, address translation module 96 reads the SPS value for the standard page containing the address from SPS field 73 of page table entry 72 for the page. If TLB 52 includes a cached mapping for the standard page containing the address, address translation module 96 reads the SPS value for the standard page from secure pool size data 53.

After translating a virtual address received from CPU 42 to a physical address and determining the SPS value for the page that includes the physical address, address translation module 96 sends the physical address, the determined SPS value, and an indication of whether the memory access direction is a write to memory direction to secure pool logic 46.

In accordance with the techniques described herein, secure pool logic 46 determines whether the received physical address is a protected memory space of the memory page. Secure pool logic 46 comprises pool size calculator 98 and least significant bit comparator 99 ("LSB comparator 99"). Pool size calculator 98 receives an SPS value for a memory page. If the SPS value is zero, the memory page does not contain secure objects and pool size calculator 98 ends secure pool logic 46 execution for the particular memory access direction. Otherwise, pool size calculator calculates the number of least significant bits that, when set to zero, indicate that the physical address is a protected memory space of a secure object. For exemplary router 10, the number of least significant bits to check, n, is determined according to the formula n=$\log_2$(secure_object_size), where secure_object_size is the size, in bytes, of the secure objects for a secure memory page. The value for secure_object_size is (SPS value+4)$^2$. For example, a page having an SPS value of 1 has secure objects of size (1±4)$^2$, or 32 bytes. Combining these equations produces the formula n=SPS value+4.

Pool size calculator 98 sends the calculated value of n to LSB comparator 99. LSB comparator 99 may be a variable-length bit-mask or other logic. LSB comparator 99 determines whether the n least significant bits of the received physical address are all cleared (i.e., set to zero). If not, LSB comparator 99 ends secure pool logic 46 execution for the particular memory access direction. When the n bits are cleared, however, LSB comparator 99 signals secure pool logic 46 that the particular on a secure page.

If secure pool logic 46 determines that the respects a protected memory space, secure pool logic 46 determines whether the memory access direction is a write to memory direction. If so, secure pool logic 46 signals a secure pool page fault exception to CPU 42 via CPU interface 92. In response, CPU 42 generally blocks the execution thread and populates the exception to exception handler 34. Blocking the execution thread prevents further execution of instructions for the thread until an intervening event unblocks the thread. In this manner, secure pool logic 46 detects memory overruns and otherwise impermissible memory access to secure memory pages.

In some embodiments, secure pool logic 46 does not determine whether the memory access direction is a write to memory direction. Rather, secure pool logic 46 sends a signal to CPU 42 via CPU interface 92 that the memory access direction respects a protected memory space. In turn, CPU 42 determines whether the command is a write command and itself decides whether to block the command from execution.

In the absence of an exception, MMU 44 then sends the physical address to main memory 40 via memory interface 94 as well as a notification to CPU 42 via CPU interface 92 that main memory 40 has received the physical address. CPU 42 then performs the memory access, such as writing a data to the physical address or reading a data from the physical address.

Figure 8:
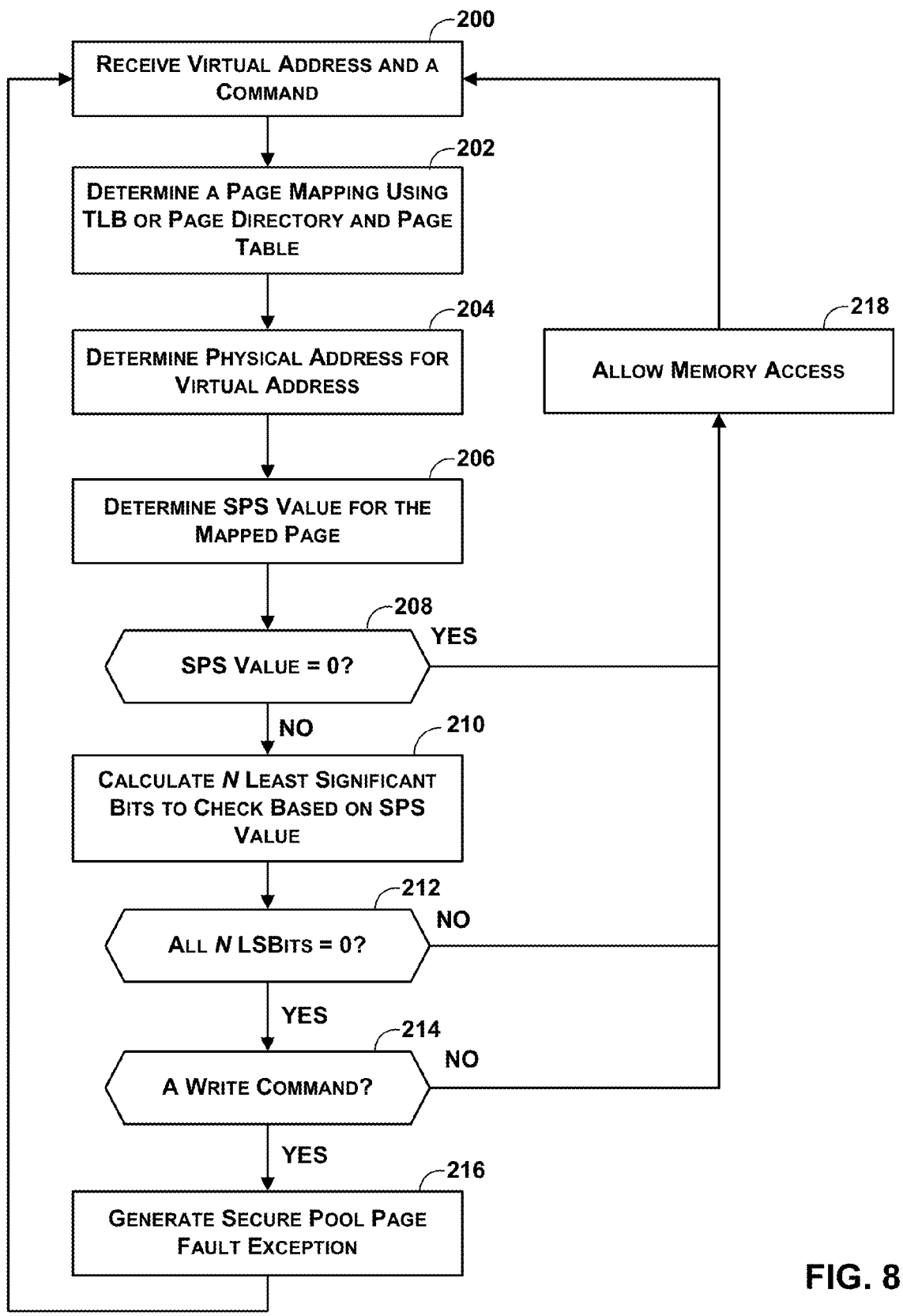
FIG. 8 is a flowchart illustrating exemplary steps for detecting a memory overrun according to the techniques described.

FIG. 8 is a flowchart illustrating an exemplary mode of operation for MMU 44 for detecting memory overruns according to the techniques described. MMU 44 receives, from CPU 42, a command and virtual address for translation to a physical address to further execution of the command (200). MMU 44 uses virtual address bits to lookup a page mapping according to either a TLB 52 entry or, in the case of a TLB miss, entries in the page directory and page table for the currently executing process (202), and MMU 44 then determines the physical address corresponding to the received virtual address based on the mapping (204).

As an aspect of looking up the page mapping, MMU 44 determines the SPS value associated with the mapped page (206). If the SPS value is zero (YES branch of 208), MMU 44 allows the memory access for the received command to proceed (218). Otherwise (NO branch of 208), MMU 44 calculates, based on the SPS value, the n least significant bits of a physical address that can identify the address as specifying a protected memory space (210). If at least one of the n least significant bits of the physical address is set (i.e., has a value of one), then the physical address does not specify a protected memory space (NO branch of 212), and MMU 44 allows the memory access for the received command to proceed (218). If, however, the n least significant bits are zero (YES branch of 212), MMU 44 further determines whether the received command is a write command and, if so (YES branch of 214), generates a secure pool page fault exception (216). If not (NO branch of 214), MMU 44 allows the memory access for the received command to proceed (218).

Figure 9:
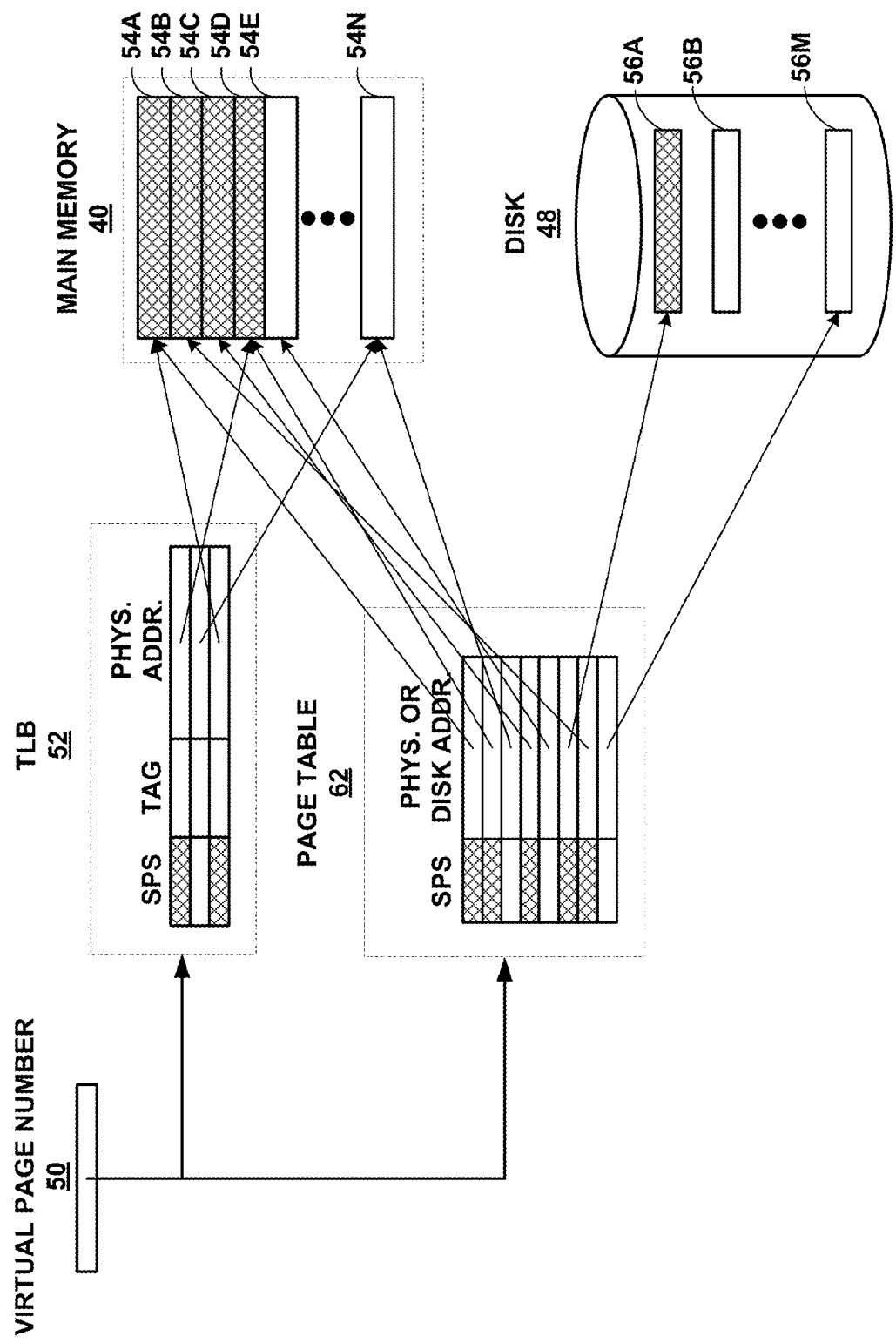
FIG. 9 is a block diagram illustrating example relationships between components and data structures that router 10 uses to implement the techniques described.

FIG. 9 illustrates relationships between main memory 40, disk 48, page table 62, and TLB 52 as implemented according to the techniques described. Memory manager 26 cooperates with MMU 44 to partition main memory 40 into virtual memory pages. Each of the virtual pages 54 allocated for use in a process has a corresponding page table entry in page table 62 that specifies one of physical pages 54A-54N ("physical pages 54") in the main memory 40 address space as well as an associated secure pool size (SPS) value for the virtual page. Non-zero SPS values are identified in FIG. 9 by a criss-cross pattern. If a virtual page is presently swapped to one of disk pages 56A-56M in secondary storage, the corresponding page table entry specifies instead the address of the virtual page in disk 48.

Recently accessed ones of physical pages 54 also have corresponding entries in TLB 52 that are keyed to a virtual page number by a tag field, like page table entries, include an SPS value and physical address for the physical page corresponding the virtual page.

MMU 44 uses a virtual address and page directory to determine the virtual page number 50 for the virtual address. MMU 44 then keys into TLB 52 using virtual page number 50 and the tag field of the TLB 52 entries in order to map to the appropriate one of physical pages 54. On the occasion of a TLB miss, MMU instead keys into page table 62 to map to the appropriate one of physical pages 54.

FIG. 9 also illustrates an additional aspect of the techniques, whereby memory manager 26 allocates and, when necessary, swaps secure virtual pages (identified by a criss-cross pattern in main memory 40 and disk 48) into physical pages 54 that are adjacent. For example, memory manager 26 may establish a secure page pool using a contiguous subset of physical pages 54 that memory manager 26 then uses to store virtual pages that comprise secure objects. As a result, the protected memory space for the first (by address) secure object on a physical page, e.g., physical page 54B, protects against memory overruns caused by an executing process attempting to write to a memory location adjacent to the last (by address) secure object of physical page 54A. In this manner, the techniques protect a larger address space.

Various embodiments of the invention have been described. These and other embodiments are within the scope of the following claims.

The invention claimed is:
1. A method comprising:
partitioning an addressable memory space for a device into a plurality of memory pages;
requesting, with a daemon executing on the device, a secure object by invoking a system call using a secure pool size value for a secure pool size parameter of the system call;

assigning the secure pool size value to a first one of the plurality of memory pages, wherein the secure pool size value defines a plurality of protected memory spaces that partition the first memory page into a plurality of secure objects;

returning a reference to a first one of the plurality of secure objects of the first memory page to the daemon in response to the request for the secure object;

receiving a command that references a memory address; and determining, based at least on the secure pool size value, whether a memory address is an address of one of the plurality of protected memory spaces of the first memory page, wherein the memory address corresponds to a physical address of the first memory page.

2. The method of claim 1, wherein the secure pool size value further defines a size for each of the plurality of secure objects of the first memory page, and further comprising:

inserting a reference to each of the plurality of secure objects of the first memory page into a secure object pool for the size, wherein returning the reference to one of the plurality of secure objects of the first memory page comprises marking the first secure object as reserved in the secure object pool for the size.

3. The method of claim 2, further comprising:

freeing, with the daemon, the first secure object; and responsive to freeing the first secure object, unmarking the first secure object to return the first secure object to the secure object pool for the size.

4. The method of claim 2, further comprising:

requesting, with a daemon executing on the device, an additional secure object by invoking the system call with the secure pool size value for the secure pool size parameter of the system call;

determining all secure objects in the secure object pool for the size are marked as reserved;

assigning the secure pool size value to a second one of the plurality of memory pages, wherein the secure pool size value defines a plurality of protected memory spaces that partition the second memory page into a plurality of secure objects;

returning a reference to one of the plurality of secure objects of the second memory page to the daemon in response to the request for the additional secure object; and determining, based at least on the secure pool size value, whether a second memory address is an address of one of the plurality of protected memory spaces in the second memory page, wherein the second memory address corresponds to a physical address of the second memory page, wherein the memory address is a first memory address different than the second memory address.

5. The method of claim 1, wherein assigning the secure pool size value to the first one of the plurality of memory pages comprises setting a secure pool size field in a page table entry associated with the first memory page to the secure pool size value.

6. The method of claim 1, wherein the memory address corresponds to a physical address of the first memory page that is a higher memory address than any of the memory addresses within the first secure object, the method further comprising:

determining the memory address corresponds to a physical address that is a protected memory space of a second one of the plurality of secure objects of the first memory page; and sending an exception to the daemon in response to the determination.

7. The method of claim 1, further comprising:

determining the memory address corresponds to a physical address that is a protected memory space of the first secure object; and sending an exception to the daemon in response to the determination.

8. The method of claim 1, requesting, with the daemon, an additional secure object by invoking a system call using a second secure pool size value for the secure pool size parameter of the system call, wherein the first secure pool size value is different than the second secure pool size value;

assigning the second secure pool size value to a second one of the plurality of memory pages, wherein the second secure pool size value defines a plurality of protected memory spaces that partition the second memory page into a plurality of secure objects, wherein a size of each of the plurality of secure objects of the first memory page is different than a size of each of the plurality of secure objects of the second memory page; and determining, based at least on the second secure pool size value, whether a second memory address is an address of one of the plurality of protected memory spaces in the second memory page, wherein the memory address is a first memory address different than the second memory address.

9. The method of claim 1, wherein determining, based at least on the secure pool size value, whether a memory address is an address of one of the plurality of protected memory spaces of the first memory page comprises:

calculating a number of memory address bits of the memory address to examine based at least on the secure pool size value; and determining whether all of the number of memory address bits of the memory address are cleared.

10. The method of claim 1, wherein the command comprises a program instruction of the daemon.

11. A device comprising:

a main memory that enables an addressable memory space for the device;

a plurality of memory pages, wherein each of the plurality of memory pages comprises a separate, contiguous block of addressable memory locations within the addressable memory space;

a daemon executing on the device to request a secure object by invoking a system call using a secure pool size value for a secure pool size parameter of the system call;

a memory manager comprising a secure pool allocator that assigns the secure pool size value to a first one of the plurality of memory pages, wherein the secure pool size value defines a plurality of protected memory spaces that partition the first memory page into a plurality of secure objects, wherein the memory manager returns a reference to a first one of the plurality of secure objects of the first memory page to the daemon in response to the request for the secure object;

a processor that receives a command that references a memory address, a memory management unit comprising secure pool logic that determines, based at least on the secure pool size value, whether a memory address is an address of one of the plurality of protected memory spaces of the first memory page, wherein the memory address corresponds to a physical address of the first memory page.

12. The device of claim 11,
wherein the secure pool size value further defines a size for each of the plurality of secure objects of the first memory page,
wherein the secure pool allocator inserts a reference to each of the plurality of secure objects of the first memory page into a secure object pool for the size,
wherein the memory manager marks the first secure object as reserved in the secure object pool for the size.

13. The device of claim 12,
wherein the daemon frees the first secure object,
wherein the memory manager, responsive to freeing the first secure object, unmarks the first secure object to return the first secure object to the secure object pool for the size.

14. The device of claim 12,
wherein the daemon requests an additional secure object by invoking the system call with the secure pool size value for the secure pool size parameter of the system call,
wherein the memory manager determines all secure objects in the secure object pool for the size are marked as reserved,
wherein the secure pool allocator assigns the secure pool size value to a second one of the plurality of memory pages, wherein the secure pool size value defines a plurality of protected memory spaces that partition the second memory page into a plurality of secure objects,
wherein the memory manager returns a reference to one of the plurality of secure objects of the second memory page to the daemon in response to the request for the additional secure object, and
wherein the secure pool logic determines, based at least on the secure pool size value, whether a second memory address is an address of one of the plurality of protected memory spaces in the second memory page, wherein the second memory address corresponds to a physical address of the second memory page, wherein the memory address is a first memory address different than the second memory address.

15. The device of claim 11, further comprising:
a page table comprising a page table entry associated with the first memory page,
wherein the secure pool allocator assigns the secure pool size value to the first one of the plurality of memory pages by setting a secure pool size field in the page table entry to the secure pool size value.

16. The device of claim 11, further comprising:
a central processing unit (CPU) interface of the memory management unit;
wherein the memory address corresponds to a physical address of the first memory page that is a higher memory address than any of the memory addresses within the first secure object,
wherein the secure pool logic determines the memory address corresponds to a physical address that is a protected memory space of a second one of the plurality of secure objects of the first memory page,
wherein the CPU interface sends an exception to the daemon in response to the determination.

17. The device of claim 11, further comprising:
a central processing unit (CPU) interface of the memory management unit,
wherein the secure pool logic determines the memory address corresponds to a physical address that is a protected memory space of the first secure object,
wherein the CPU interface sends an exception to the daemon in response to the determination.

18. The device of claim 11,
wherein the daemon requests an additional secure object by invoking a system call using a second secure pool size value for the secure pool size parameter of the system call, wherein the first secure pool size value is different than the second secure pool size value,
wherein the secure pool allocator assigns the second secure pool size value to a second one of the plurality of memory pages, wherein the second secure pool size value defines a plurality of protected memory spaces that partition the second memory page into a plurality of secure objects,
wherein a size of each of the plurality of secure objects of the first memory page is different than a size of each of the plurality of secure objects of the second memory page, and
wherein the secure pool logic determines, based at least on the second secure pool size value, whether a second memory address is an address of one of the plurality of protected memory spaces in the second memory page, wherein the memory address is a first memory address different than the second memory address.

19. The device of claim 11, wherein the secure pool logic determines, based at least on the secure pool size value, whether a memory address is an address of one of the plurality of protected memory spaces of the first memory page by:
calculating a number of memory address bits of the memory address to examine based at least on the secure pool size value; and
determining whether all of the number of memory address bits of the memory address are cleared.

20. The device of claim 11, wherein the command comprises a program instruction of the daemon.

21. A memory management unit comprising:
a central processing unit (CPU) interface that receives, from a processor, a command that references a memory address;
an address translation module comprising a translation look-aside buffer (TLB) that stores:
a page entry that maps a set of virtual addresses to a physical memory page;
a secure pool size data for the physical memory page that defines a plurality of protected memory spaces that partition the physical memory page into a plurality of secure objects;
secure pool logic that determines, based at least on the secure pool size data, whether the memory address corresponds to one of the plurality of protected memory spaces of the physical memory page.

22. The memory management unit of claim 21, further comprising:
a pool size calculator of the secure pool logic that calculates a number of memory address bits to examine based at least on the secure pool size data for the physical memory page; and
a lowest significant bit comparator of the secure pool logic to determine whether all of the number of memory address bits are cleared, wherein the secure pool logic determines the memory address corresponds to one of the plurality of protected memory spaces of the physical memory page when all of the number of memory address bits are cleared.

23. The memory management unit of claim 21, wherein the CPU interface signals secure pool page fault exception to the processor when the memory address corresponds to one of the plurality of protected memory spaces of the physical memory page.

\* \* \* \* \*